R. C. BLEAN.
WHEEL.
APPLICATION FILED JAN. 13, 1908.
918,118.
Patented Apr. 13, 1909.
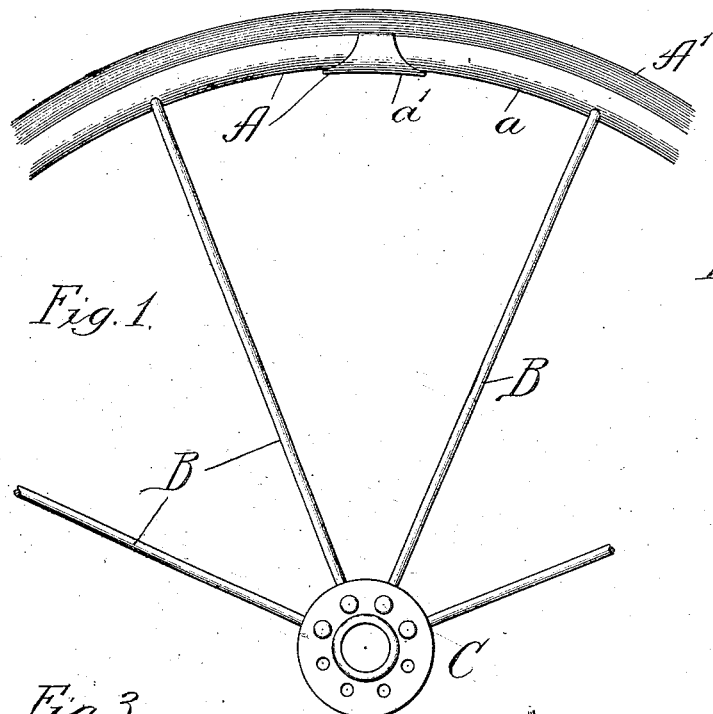
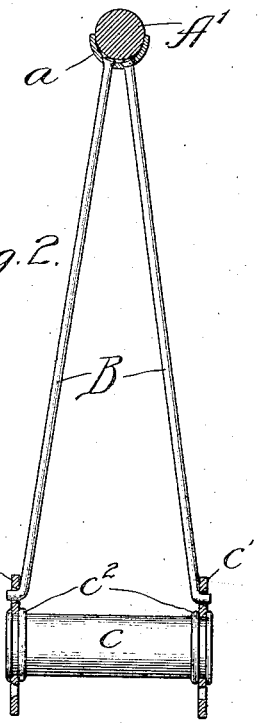
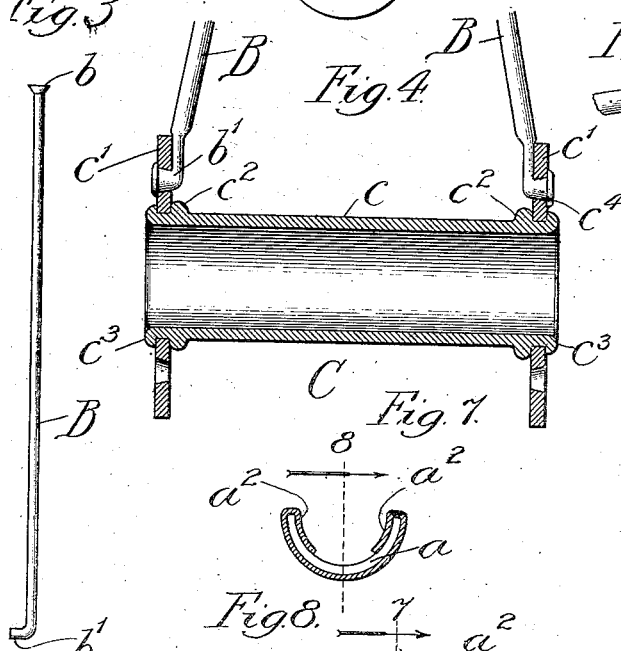
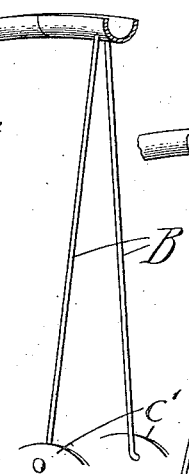
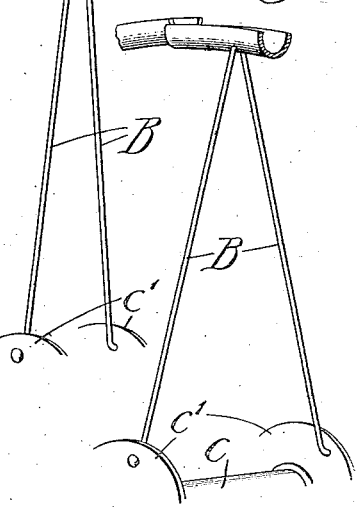
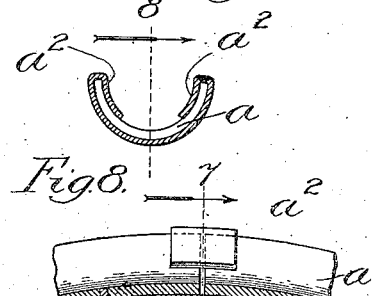
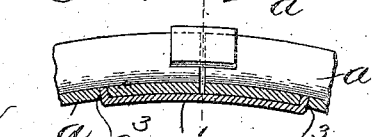
Witnesses:
John Enders
Chas. H. Buell
Inventor:
Robert C. Blean
By Dyrenforth, Lee, Chritton & Wiles
Attys.

UNITED STATES PATENT OFFICE.

ROBERT C. BLEAN, OF STURGIS, MICHIGAN, ASSIGNOR, BY MESNE ASSIGNMENTS, TO AMERICAN WHEEL COMPANY, OF STURGIS, MICHIGAN, A CORPORATION OF MICHIGAN.

WHEEL.

No. 918,118.     Specification of Letters Patent.     Patented April 13, 1909.

Application filed January 13, 1908. Serial No. 410,555.

*To all whom it may concern:*

Be it known that I, ROBERT C. BLEAN, a citizen of the United States, residing at Sturgis, in the county of St. Joseph and State of Michigan, have invented a new and useful Improvement in Wheels, of which the following is a specification.

My invention relates particularly to metal-wheels such as are used for baby-carriages, go-carts, doll-carriages and the like; and my primary object is to provide an inexpensive wheel of the character indicated which is light and of very durable construction, as well as an improved method of constructing wheels of such character.

The invention is illustrated in its preferred embodiment in the accompanying drawing, in which—

Figure 1 represents a broken side elevational view of a wheel constructed in accordance with my invention; Fig. 2, a broken sectional view of the same; Fig. 3, a view of a spoke employed; Fig. 4, a broken sectional view on an enlarged scale, showing the construction at the hub of the wheel; Fig. 5, a broken perspective view showing a fragment of the wheel in the process of construction and before the insertion of the hub-barrel; Fig. 6, a similar view after the insertion of the hub-barrel; Fig. 7, a section taken, as indicated, at line 7 of Fig. 8 and showing the manner in which the ends of the annular member which forms the rim of the wheel are joined together; and Fig. 8, a section taken, as indicated, at line 8 of Fig. 7.

In the construction illustrated, the wheel comprises a rim A; a tire $A^1$; spokes B; and a hub C.

The rim A is formed from a sheet-metal ribbon or band $a$ which is given a dished or concaved cross-section and curved into annular form to receive the tire, and a clip $a^1$ which serves to connect the abutting ends of the annular member. The clip $a^1$ is dished to conform to the rim-member $a$, as shown in Fig. 7, and has its extremities $a^2$ bent over into contact with the concave surface of the rim-member $a$, as clearly shown in Figs. 7 and 8. The tire may be of any suitable construction.

Each spoke B has at its outer end an upset portion or head $b$ and has a laterally-turned inner end $b^1$. The rim-member $a$ is provided with perforations which are countersunk at the exterior surface of the rim to accommodate the heads $b$ of the spokes. The perforations are arranged preferably in pairs to receive the spokes in pairs, as shown in Fig. 2.

The hub C comprises a hub-barrel $c$ and hub-rims $c^1$ carried by the end-portions of the barrel $c$. The hub-barrel $c$ is equipped near its ends with flanges $c^2$ which serve to space the hub-rims $c^1$, which hub-rims have central perforations which fit over the projecting end-portions of the hub-barrel, and said projecting end-portions are spun outwardly or riveted to form flanges $c^3$ serving to retain the hub-rims $c^1$ firmly in place on the end-portions of the hub-barrel. The hub-rims $c^1$ are provided with perforations which are arranged in pairs corresponding with the pairs of perforations in the rim of the wheel, and the perforations in the hub-rims receive the laterally-turned ends $b^1$ of the spokes, the extremities of said laterally-turned ends being upset or riveted at the exterior of the hub-rims, thus forming heads $c^4$.

The sheet-metal clip $a^1$ is provided with lugs $a^3$ which enter perforations in the rim-member $a$, when the clip is applied, as best shown in Fig. 8.

The manner of assembling the parts is preferably as follows: The wire-spokes of one side of the wheel, with the heads $b$ preparatorily formed and the inner ends $b^1$ preparatorily laterally turned, are entered through the perforations in the wheel-rim from the exterior, and the laterally-turned inner ends of said spokes are then inserted through the perforations in the corresponding hub-rim $c^1$. The inner ends of said spokes are then subjected to the action of a press which rivets them. The remainder of the spokes are then inserted, and their inner ends are entered in the other hub-rim and press-riveted. The hub-barrel is then inserted, the hub-rims $c^1$ being separated to permit the insertion of the hub-barrel and the wheel-rim yielding to permit the spreading of the hub-rims $c^1$, as shown in Fig. 6, and after the barrel is inserted, its ends are upset, spun or riveted to form the flanges $c^3$. The annular member $a$ is then in condition so that its ends may be brought into abutting relation and the clip $a^1$ applied.

If desired, the hub-rims $c^1$ may be placed upon the hub-barrel before the inner ends of the spokes are connected with the hub-rims, and an annular anvil may be then placed about the hub-barrel and the wheel subjected to the action of a press to rivet the inner ends of the spokes, after which the ends of the annular rim *a* may be connected by the clip *a¹*.

It will be noted in Fig. 8 that the ends of the annular rim-member *a* do not closely abut, and it may be stated that in punching the holes for the lugs *a³* of the clip *a¹* they are purposely punched close enough to the ends of the member *a* to insure a slight space when the clip is applied. This facilitates the assemblage of the parts and renders unnecessary absolute accuracy in constructing the parts.

The foregoing detailed description has been given for clearness of understanding only, and no undue limitation should be understood therefrom.

What I regard as new, and desire to secure by Letters Patent, is—

1. A wheel comprising a rim provided with perforations, spokes entered in said perforations and having heads at the exterior of the rim and having outwardly turned inner ends, hub-rims having perforations in which said outwardly turned ends are entered and riveted, and a hub-barrel having flanges spacing said hub-rims, the ends of said barrel extending through said hub-rims and riveted at the exterior thereof.

2. The method of producing and assembling a wheel, which consists in employing a perforate annular rim formed with disconnected ends, entering wire-spokes through the perforations of said rim-member from the exterior, said wire-spokes having heads at their outer ends and having laterally-turned inner ends, entering the laterally-turned inner ends of the spokes in perforations in hub-members and riveting the same, and applying a clip to join the ends of the wheel-rim.

ROBERT C. BLEAN.

In presence of:
RALPH A. SCHAEFER,
W. T. JONES.